(12) United States Patent
Dong et al.

(10) Patent No.: US 7,233,132 B1
(45) Date of Patent: Jun. 19, 2007

(54) CURRENT SENSING IN MULTIPLE COUPLED INDUCTORS BY TIME CONSTANT MATCHING TO LEAKAGE INDUCTANCE

(75) Inventors: Yan Dong, Blacksburg, VA (US); Ming Xu, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 11/341,874

(22) Filed: Jan. 30, 2006

(51) Int. Cl.
*G05F 1/575* (2006.01)
*G05F 1/618* (2006.01)

(52) U.S. Cl. .................... 323/272; 323/290
(58) Field of Classification Search ........... 323/222, 323/224, 272, 282, 285, 268, 271, 277, 290
See application file for complete search history.

(56) References Cited

U.S. PATENT DOCUMENTS

| | | | | |
|---|---|---|---|---|
| 5,982,160 A | * | 11/1999 | Walters et al. | 323/282 |
| 6,469,481 B1 | * | 10/2002 | Tateishi | 323/282 |
| 6,897,641 B1 | * | 5/2005 | Herbert | 323/282 |
| 7,026,798 B2 | * | 4/2006 | Cheung et al. | 323/225 |
| 7,106,035 B2 | * | 9/2006 | Xing | 323/282 |

* cited by examiner

*Primary Examiner*—Gary L Laxton
(74) *Attorney, Agent, or Firm*—Whitham, Curtis, Christofferson & Cook, PC (57) ABSTRACT

Voltage regulators often have coupled output inductors because coupled output inductors provide improvements in cost and efficiency. Coupled inductors are often used in multi-phase voltage regulators. Feedback control of voltage regulators often requires accurate and responsive sensing of output current. Provided is a technique for accurately sensing the magnitude of output current in coupled inductors. An RC circuit (comprising a resistor and capacitor in series) is connected in parallel with the coupled inductor. The inductor has a leakage inductance Lk and a DC (ohmic) resistance of DCR. The resistor and capacitor are selected such that an RC time constant is equal to an L/R time constant of Lk/DCR. With the matching time constants, a sum of voltages on the capacitors is accurately proportional to a sum of currents flowing in the output inductors. Also provided is a technique for sensing current when an uncoupled center tap inductor is present.

20 Claims, 5 Drawing Sheets

CURRENT SENSING IN MULTIPLE COUPLED INDUCTORS BY TIME CONSTANT MATCHING TO LEAKAGE INDUCTANCE

FIELD OF THE INVENTION

The present invention relates generally to sensing electrical current flowing through coupled inductors. More specifically, it relates to a DC resistance (DCR) technique for sensing current flowing through coupled output inductors in a voltage regulator or DC to DC converter.

BACKGROUND OF THE INVENTION

Voltage regulators (VRs) and DC-to-DC converters are widely used for providing electrical power for computer processors and telecommunications electronics. Many voltage regulators include circuits for measuring output current and voltage so that feedback control of the voltage regulator is possible. One method for feedback control is adaptive voltage positioning (AVP), in which the output voltage is controlled in response to the output current. AVP is particularly well suited for use in microprocessor voltage regulators and voltage regulators for memory and graphics-processing circuits. AVP typically requires accurate and high speed sensing of output current.

Figure 1:
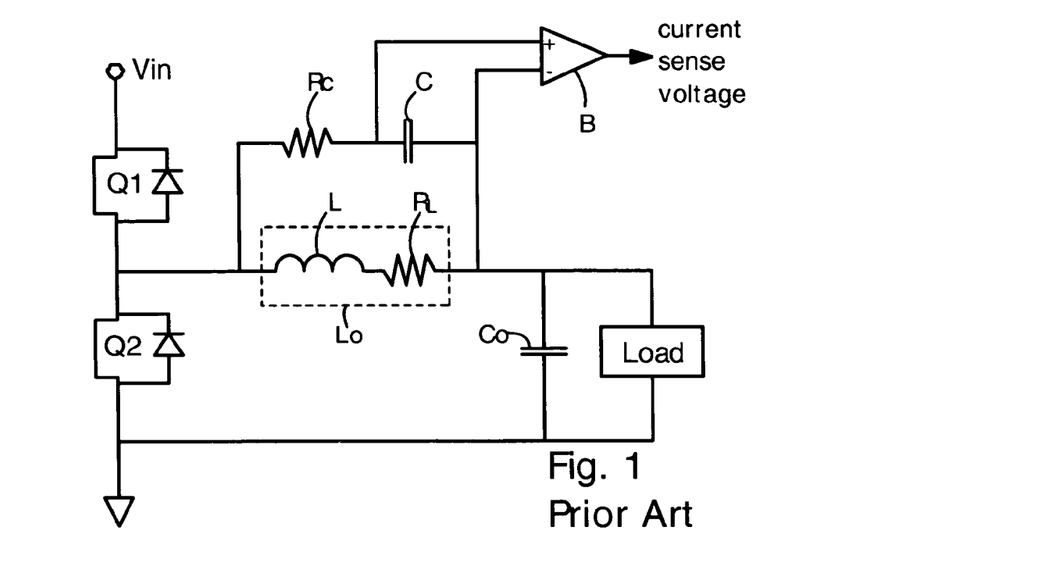
FIG. 1 (Prior Art) shows a buck regulator with DCR current sensing according to the prior art.

One method for accurate and high speed output current sensing is known as direct current resistance (DCR) sensing. DCR sensing is described in U.S. Pat. No. 5,982,160. FIG. 1 illustrates a buck regulator circuit employing DCR current sensing. Top and bottom switches Q1 Q2 are alternately switched and provide current pulses to output inductor Lo. Output filtering capacitor Co is connected in parallel with the load, as well known in the art. Output inductor Lo has an ideal, zero-resistance self-inductance L in series with a DC (ohmic) resistance $R_L$. The DCR current sensing method requires a capacitor C and resistor Rc connected in parallel with the output inductor Lo. Voltage across the capacitor C is provided to a voltage buffer B. The capacitor C and resistor Rc are selected so that the RC time constant matches the $L/R_L$ time constant of the output inductor Lo. With the capacitor C and resistor Rc selected in this way, the voltage across the capacitor C is accurately proportional to the voltage across the DC resistance $R_L$ of the inductor, and, hence, the current flowing through the output inductor Lo. The voltage buffer B produces a voltage (the "current sense voltage") that is proportional to the current flowing through the output inductor Lo. The output of the voltage buffer B is therefore accurately proportional to the current flowing through the output inductor Lo. The current sense voltage can be used for overload protection control, AVP or other feedback-based methods for controlling the operation of the buck regulator. A significant advantage of the DCR sensing technique is that it does not require a current sensing resistor, which dissipates energy. Hence, DCR sensing significantly improves the energy efficiency of the VR circuit.

The buck regulator of FIG. 1 has a single output inductor Lo. It is relatively simple to apply the DCR output current sensing technique to a voltage regulator circuit having a single output inductor. However, many new voltage regulator circuits, such as multi-phase buck regulators, and other more complicated resonant or quasi-resonant circuits, have coupled output inductors. Coupled output inductors tend to allow a reduction in the capacitance of output capacitor Co and therefore a reduction in cost. Also, coupled output inductors tend to improve transient performance and efficiency. For these reasons, coupled output inductors are increasingly used.

In the art, there is no known method for applying the DCR current sensing technique to coupled inductors. DCR current sensing is presently incompatible with coupled inductors. If a DCR current sensing circuit is connected to a coupled inductor, the capacitor voltage waveform will have a different shape than the inductor current waveform. Consequently, it is difficult to implement AVP (and other forms of feedback control that require accurate current sensing) in VRs that have coupled output inductors. Hence, circuit designers presently must choose between the benefits of DCR or the benefits of coupled output inductors.

It would be an advance in the arts of voltage regulators, current sensing circuits, and feedback control for VRs to provide a DCR current sensing technique compatible with coupled inductors. A DCR current sensing technique compatible with coupled inductors could extend the benefits of DCR current sensing to multiphase buck regulators and other regulators having coupled output inductors.

SUMMARY OF THE INVENTION

The present invention includes a voltage regulator having first and second output inductors. The inductors are magnetically coupled (e.g. by a ferrite core). The first output inductor has a leakage inductance Lk1 and DC (ohmic) resistance of DCR1. An RC circuit is connected in parallel with the first output inductor. The RC circuit comprises a resistor and capacitor connected in series. The RC circuit has an RC time constant equal to Lk1/DCR1. In other words, the RC circuit and first output inductor have matching time constants, based on the leakage inductance (not the total inductance or self inductance) of the first inductor. When the RC circuit and inductor are matched in this way, a voltage across the capacitor of the RC circuit is roughly representative of a current flowing through the first inductor. It is noted that the voltage on the capacitor is not accurately proportional to the current flowing through the first inductor.

A second RC circuit can be connected in parallel with the second output inductor. Also a voltage adder can be provided for receiving and adding voltages present on the capacitors of the RC circuits. The voltage adder will in this case output a voltage that is accurately proportional to a sum of currents flowing through the first and second output inductors. The output of the voltage adder will be accurately proportional to a total current flowing in the output inductors provided that every coupled inductor has a corresponding RC circuit providing a signal to the voltage adder.

The voltage regulator can be a multiple phase buck regulator or other multiple phase voltage regulator. The regulator can have 3, 4, 5, 6, 7, 8 or more phases, for example.

The voltage regulator can also have a third output inductor and a third RC circuit, or any other number of coupled inductors and RC circuits.

The RC time constants of the RC circuits can match the LR time constants (Lk1/DCR1) of the output inductors to within 20%, 10%, or 5%, for example.

Preferably, all the coupled inductors have the same values or leakage inductance (Lk) and RC resistance (DCR).

Also, voltage buffers or amplifiers can be connected to the capacitors. Voltage buffers or amplifiers will improve the accuracy of the current sensing circuit by preventing current drain from the capacitors.

Also, the present invention includes an embodiment for sensing current flowing through coupled inductors when a center tap inductor is provided. In this embodiment, the voltage regulator has N phases (where N≧2). The voltage regulator has at least two coupled output inductors, with each of the coupled output inductors in different phases of the voltage regulator. A center tap inductor receives electrical current from all the coupled output inductors and is connected in series with the coupled output inductors. The center tap inductor is not magnetically coupled to the coupled output inductors. The center tap inductor has an inductance Lko and a DC resistance DCRo. An RC circuit (comprising a resistor and a capacitor connected in series) is connected in parallel with at least one of the coupled output inductors and the center tap inductor. The coupled inductor connected in parallel with the RC circuit has a DC resistance DCR. In the present invention, the RC circuit has an RC time constant equal to $$\frac{L_{ko}}{\left(DCR_o + \dfrac{DCR}{N}\right)}.$$

With the RC time constant selected in this way, a voltage on the capacitor will be roughly representative of current flowing through the output inductor connected in parallel with the RC circuit. Hence, the current flowing through the inductor can be monitored by monitoring the voltage on the capacitor. Preferably, voltages from the capacitors is added at a voltage adder. In this case, the voltage output of the voltage adder will be accurately proportional to a total sum of currents flowing through the coupled inductors.

The RC time constant can be matched to the above equation to within 20%, 10%, or 5% for example.

Preferably, the mutual inductance of the coupled inductors is 3–20 times as great as the self-inductance of the center tap inductor. Also preferably, the self-inductance of the center tap inductor is at least 10 times as great as a leakage inductance of each of the coupled inductors. Preferably, in the embodiment having the center tap inductor, the coupled inductors have a very small or negligible leakage inductance.

The voltage regulator can have N RC circuits, with each RC circuit connected in parallel with a coupled inductor and the center tap inductor. In this case, the current flowing through N coupled inductors can be monitored. Also, a voltage adder can be provided for receiving voltages across capacitors of the RC circuits, and producing a voltage that is accurately proportional to a sum of currents flowing through the coupled output inductors.

The voltage regulator can be an N phase buck regulator, with one RC circuit for sensing current in each phase.

DETAILED DESCRIPTION

The present invention provides circuits for accurately sensing current flowing through coupled inductors. The present inventors have discovered that an RC circuit (comprising a resistor and capacitor connected in series) connected across each of two or more coupled inductors can be used to sense a sum of currents through the inductors if the RC time constant is matched to Lk/R, where Lk is the leakage inductance and R is the DC (ohmic) resistance of the inductor. In other words, the mutual inductance of a coupled inductor does not affect the time constant matching required between the inductor and the RC circuit. The present invention allows DCR current sensing techniques to be applied to coupled inductors and multi-phase voltage regulators. The present invention can be used for accurate current sensing in multiple phase voltage regulators, which commonly have coupled inductors.

In the present specification, "leakage inductance" is defined as the portion of an inductors inductance that is not coupled to other inductors. In other words, the leakage inductance is the portion of inductance that is not associated with the mutual inductance.

In the present specification, a "RC circuit" is a circuit having a resistor and a capacitor connected in series.

In the present specification, a "coupled inductor" is an inductor that has a significant mutual inductance with another coupled inductor.

Figure 2:
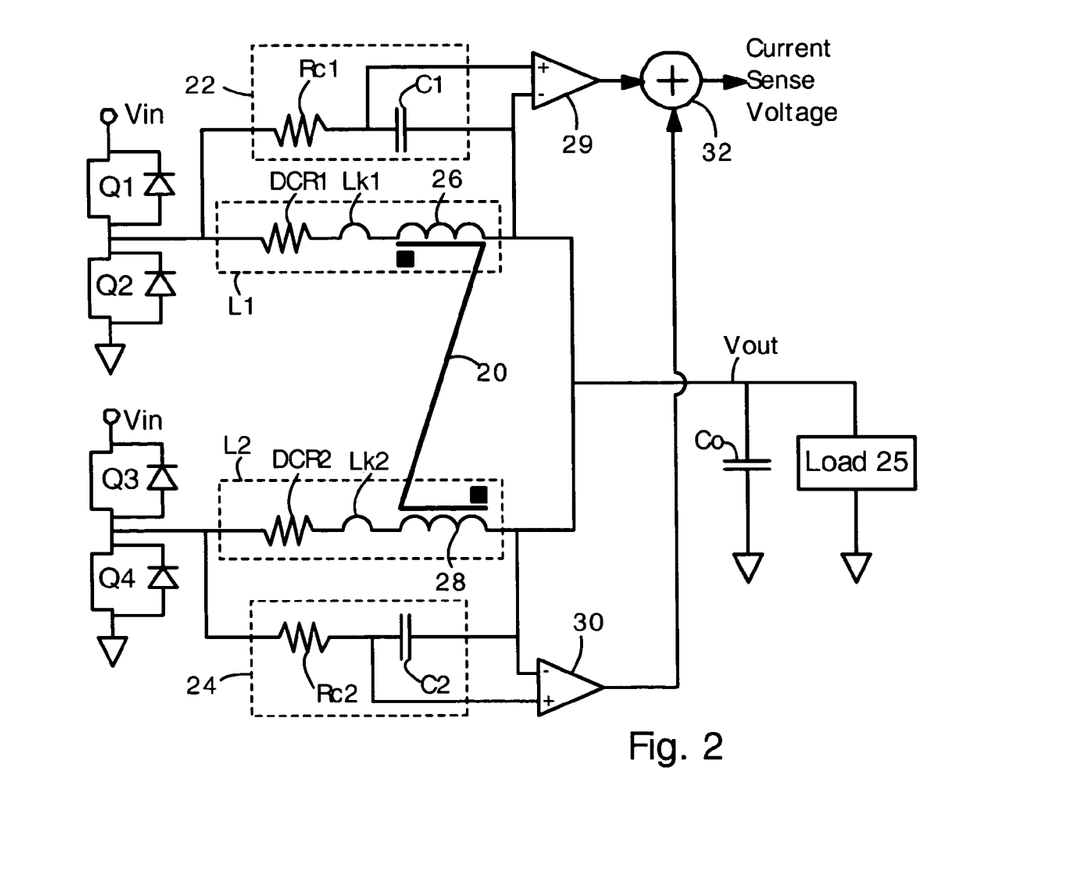
FIG. 2 shows a two-phase buck regulator according to the present invention. The buck regulator has coupled output inductors, and a current sensing circuit according to the present invention.

FIG. 2 shows a 2-phase buck regulator according to the present invention. The 2-phase buck regulator has top switches Q1 Q3 and bottom switches Q2 Q4 connected between a power source Vin and ground, as known in the art. A first output inductor L1 and a second output inductor L2 are coupled by a magnetic core 20 (e.g. made of ferrite), and have a mutual inductance (not illustrated). A first RC circuit 22 is connected in parallel with the first output inductor L1. A second RC circuit 24 is connected in parallel with the second output inductor L2. The output inductors L1 L2 are connected to an output capacitor Co and the load 25.

Each output inductor L1 L2 is illustrated as comprising three ideal components in series: a DC resistance DCR1 DCR2, a leakage inductance Lk1 Lk2, and an ideal coupled inductance 26 28. The ideal coupled inductances 26 28 comprise an ideal transformer. The DC resistance is the resistance to DC current. In other words, the DC resistance is the ohmic resistance of the coils of the inductors L1 L2. The leakage inductance Lk1 Lk2 is the inductance that is not coupled between the inductors.

Typically, the leakage inductances Lk1 Lk2 will be smaller than the mutual inductance of the coupled inductors L1 L2. For example, the ratio between the coupled inductances 26 28, and the leakage inductances Lk1 Lk2 will typically be in the range of about 2:1 to 15:1, more typically about 4:1 to 10:1. The leakage inductances Lk1 Lk2 preferably have the same values (e.g. to within 10% or 20%). Also, the leakage inductances Lk1 Lk2 should have controlled, predetermined values such that proper time constant matching is possible.

Also preferably, the DC resistances DCR1 DCR2 have the same values (e.g. to within 10% or 20%).

Each RC circuit includes a resistance Rc1 Rc2 in series with a capacitor C1 C2. A voltage across each capacitor C1 C2 is provided to a voltage buffer or amplifier 29 30. The voltage buffers 29 30 are optional but preferred in the invention. Preferably, the voltage buffers 29 30 have a high input impedance.

A voltage adder 32 receives voltages output by the voltage buffers 29 30. The voltage adder 32 adds the voltages received from the voltage buffers 29 30, and produces a current sense voltage. The current sense voltage is the sum of the voltages output from the voltage buffers 29 30. The current sense voltage is accurately proportional to the sum of currents flowing through the output inductors L1 L2. The voltage adder 32 can be an analog circuit or a digital circuit, for example.

Figure 3:
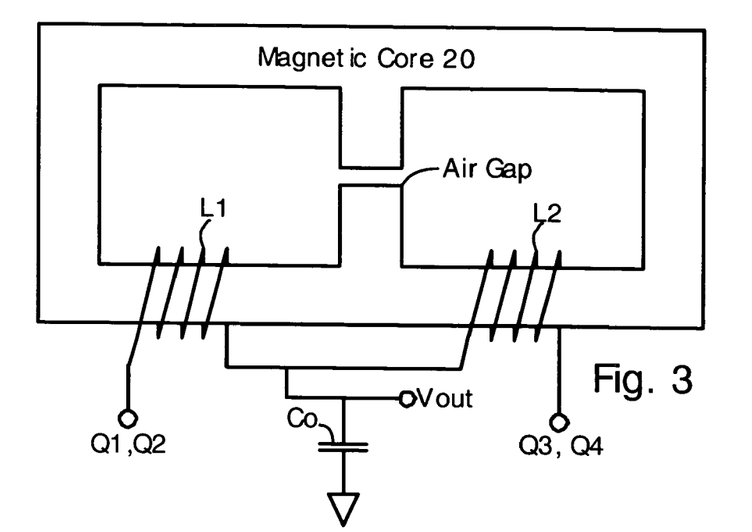
FIG. 3 shows exemplary coupled output inductors that can be used in the circuit of FIG. 2.

It is important to note that the coupled inductors in FIG. 2 comprise a transformer with a relatively high but controlled amount of leakage inductance. FIG. 3, for example, shows an exemplary coupled inductor (i.e. transformer) structure that can be employed for the coupled inductors L1 L2. The output terminal is connected to the output capacitor Co. The structure has a magnetic core 20 with an air gap (or other features) designed to provide a controlled amount of leakage inductance in the output inductors L1 L2.

In the present invention, it is essential for the RC circuits 22 24 to be matched to the leakage inductance values of the coupled inductors L1 L2. The RC circuits are not matched to the total self-inductance values of the coupled inductors L1 L2. Specifically, in the invention, the RC circuits 22 24 and inductors L1 L2 are matched such that (Rc1)(C1)=Lk1/DCR1 and (Rc2)(C2)=Lk2/DCR2. In other words the RC time constant is set equal to the RL time constant calculated from the DC resistance and leakage inductance values. The present inventors have discovered that when the RC circuits and coupled inductors are matched in this way, the sum of voltages across the capacitors C1 C2 is proportional to the sum of currents flowing through the coupled inductors L1 L2. The total current flowing through both coupled inductors L1 L2 can be determined by adding the voltages present across the capacitors C1 C2. The voltage adder 32 performs this function and provides a voltage output (the current sense voltage) that is accurately proportional to the sum of currents flowing through both output inductors L1 L2.

It is important to note that the voltages on capacitors C1 C2 is not necessarily accurately representative of the current flowing through each of the inductors L1 L2. Hence, in the present invention, it is generally not possible to accurately determine the current in each inductor L1 L2. However, the present invention does allow the accurate sensing of a sum of currents in the inductors L1 and L2. For AVP and other feedback techniques in multi-phase voltage regulators, the total current (i.e. sum of currents in each phase) is important, whereas the current flowing in each phase is not.

In the present invention, the RC circuits 22 24 and inductors L1 L2 do not need to be matched extremely accurately. The current sensing will be accurate if the RC circuits and coupled inductors L1 L2 are accurately matched. However, a match within 20%, 10% or 5% is adequate for many applications of the present invention. In critical applications, a match of better than 1% or 2% may be required. An accurate match is preferred in the invention. However, high tolerance electronic components are expensive and present cost-performance accuracy tradeoffs.

The voltage buffers 29 30 are preferred because they provide more accurate current measurement, but they are not essential in the invention. Voltage from the capacitors C1 C2 can be provided directly to the voltage adder 32, particularly if the voltage adder has high impedance inputs.

In operation, the voltages across the capacitors C1 C2 can be continuously or intermittently monitored by the voltage buffers 29 30 and continuously or intermittently provided to the voltage adder 32. The current sense voltage produced by the voltage adder will be accurately proportional to the sum of currents flowing through the coupled inductors L1 L2. The current sense voltage can be used for feedback control of the voltage regulator, as known in the art. For example, the current sense voltage can be used for adaptive voltage positioning (AVP) control of the voltage regulator, for overload protection, for pulse-width modulation of the switches Q1 Q2 Q3 Q4 or for other forms of feedback control known in the art.

Figure 4:
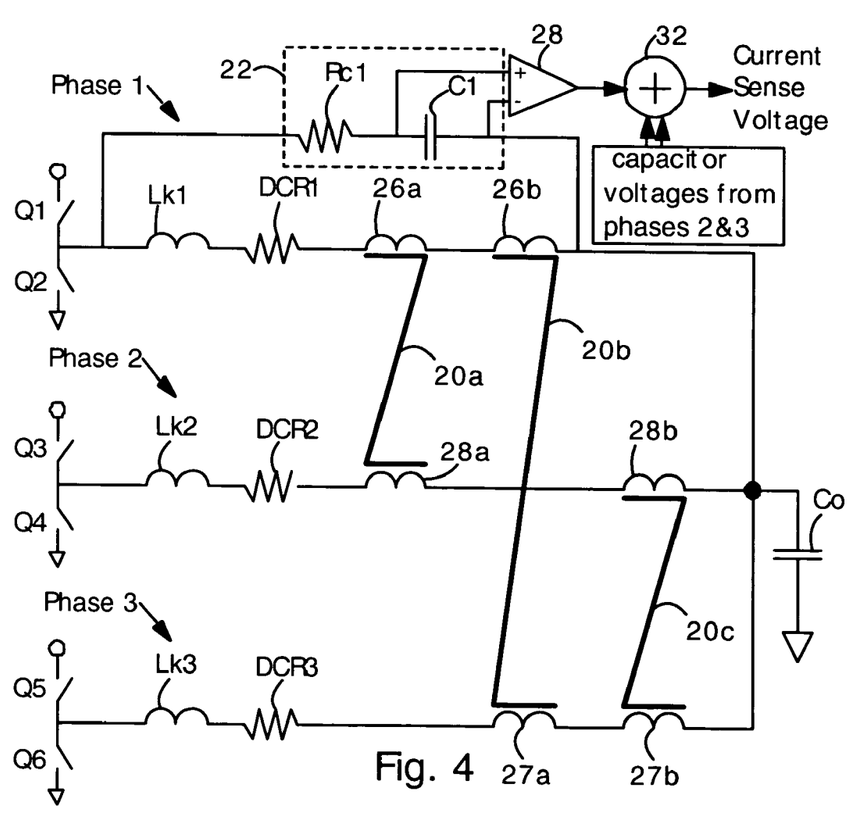
FIG. 4 shows a 3-phase buck regulator according to the present invention.

It is important to note that the present invention and appended claims include embodiments having 3, 4, 5, 6, 7, 8 or more phases. Inductors in each phase can be coupled to inductors in every other phase. FIG. 4, for example, illustrates a 3-phase buck regulator according to the present invention. For brevity and clarity, the RC circuits and buffers for phases 2 and 3 are not illustrated, though they may be present. In the circuit of FIG. 4, each phase has two coupled inductors. For example, phase 1 has coupled inductors 26a and 26b, and phase 2 has coupled inductors 28a and 28b. The coupled inductors 26a 26b 28a 28b 27a 27b are coupled by three magnetic cores 20a 20b 20c (magnetic cores 20a 20b 20c can be discrete magnetic cores, or can be combined in a single integrated magnetic core). It is important to note that the DC resistances DCR1 DCR2 DCR3 and leakage inductances Lk1 Lk2 Lk3 are associated with both the coupled inductors 26a 26b.28a 28b 27a 27b in each phase. For example, the DC resistance DCR1 is the sum of the ohmic resistances associated with coupled inductors 26a and 26b. Similarly, the leakage inductance Lk1 is the sum of the leakage inductances associated with coupled inductors 26a 26b.

Preferably, DC resistances DCR1 DCR2 DCR3 have the same values (e.g. matched to within 10% or 20% or 30%). Also preferably, leakage inductances Lk1 Lk2 Lk3 have the same values (e.g. matched to within 10% or 20% or 30%).

Figure 5:
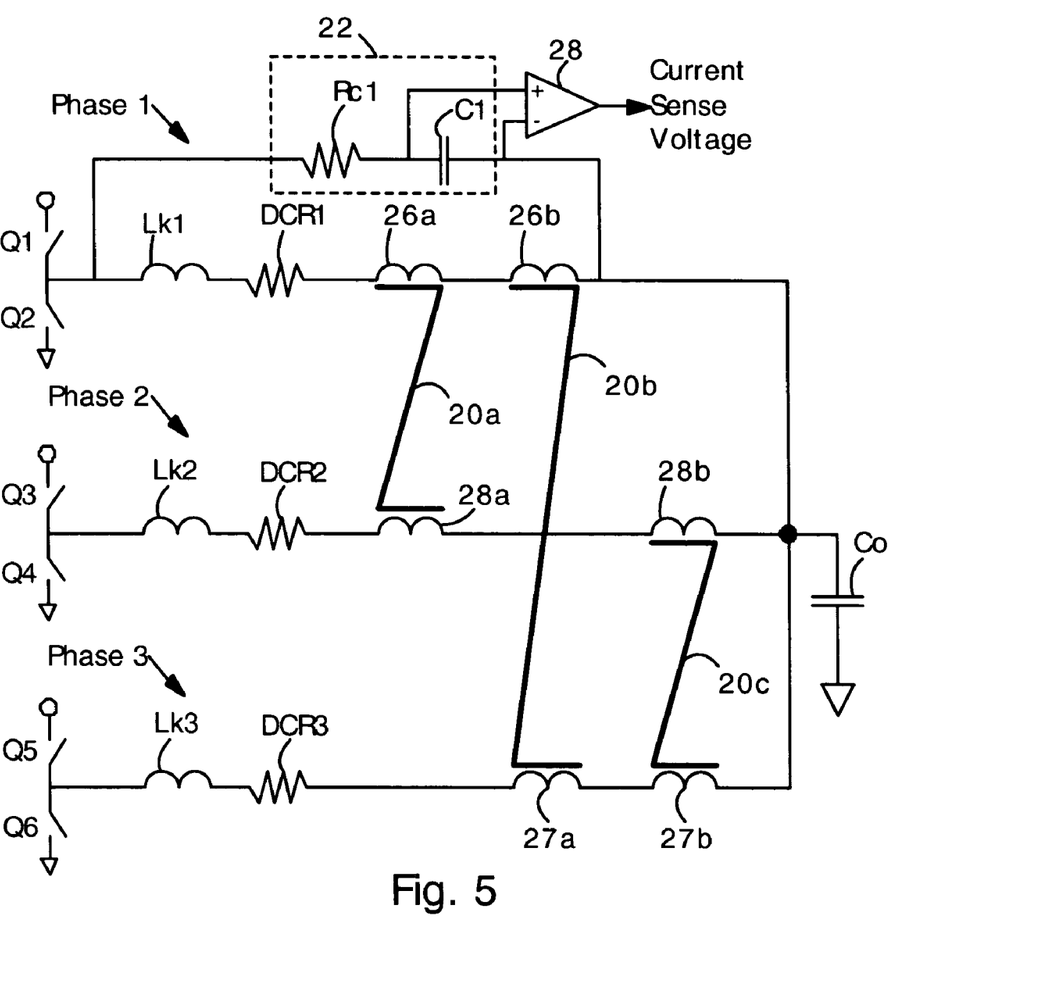
FIG. 5 shows a 3-phase buck regulator according to the present invention having a single current sensor (comprising RC circuit 22 and voltage buffer 28) for sensing current in phase 1 only.

Also, it is noted that in the present invention, it is not required to have a current sensor (comprising an RC circuit, and, optionally, a voltage buffer) for every phase. It is within the scope of the present invention and appended claims to have only one (or more) RC circuits in a multiphase regulator. In the present invention, it is possible to sense current (i.e. an average current) in only a single phase of a multiphase regulator having coupled inductors. FIG. 5, for example, shows a 3-phase buck regulator in which only phase 1 has a current sensor (comprising RC circuit 22 and voltage buffer 28). In this embodiment, the voltage adder 32 is not necessary. It is noted that in embodiments where only a single phase has a current sensor, the RC circuit and coupled inductors must be matched in the same way as noted above. Specifically, the RC circuit and coupled inductor of phase 1 must be matched such that (Rc1)(C1)=Lk1/DCR1. The coupled inductors 28a 28b 27a 27b, DC resistances DCR2 DCR3, and leakage inductances Lk2 Lk3 do not affect the operation of the RC circuit 22 connected to phase 1.

However, it is important to note that a single current sensor will provide a rough measurement of the current in the phase to which it is connected. The current measurement will be accurate when averaged over a long period of time (e.g. many cycles), but will generally not be accurate at any particular instant. Accurate current sensing at every instant can only be provided for a total sum of currents for all the phases.

In some cost sensitive applications, it may be desirable to have the current sensor on only a single phase, since the voltage adder 32 and other components will not be necessary. However, if not every phase has a current sensor, then the current sense voltage might not be accurate and responsive enough to support AVP.

Figure 6:
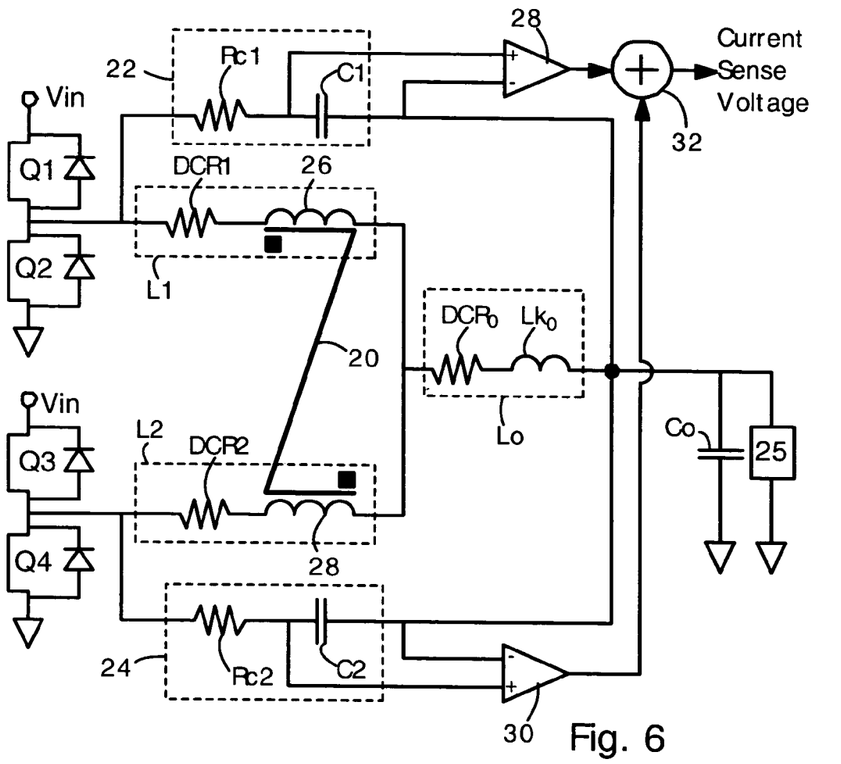
FIG. 6 shows an alternative embodiment of the present invention in which the two-phase buck regulator has a center tap inductor connected to a center tap of the coupled output inductors.

FIG. 6 shows an embodiment in which an uncoupled center tap inductor Lo is connected to the center tap connection of the coupled inductors L1 L2. The center tap inductor Lo receives electrical current from each of the coupled output inductors L1 L2 and is connected in series with the output inductors. The center tap inductor Lo is not magnetically coupled to the coupled inductors L1 L2. The coupled inductors L1 L2 preferably have essentially zero leakage inductance (i.e. the coupled inductors L1 L2 comprise an essentially ideal transformer). Hence, leakage inductances Lk1 Lk2 (shown in FIG. 2) are not illustrated in FIG. 6. The center tap inductor Lo behaves as a pure leakage inductance since it is not coupled to inductors L1 L2. Hence, the uncoupled inductor Lo is illustrated as containing a pure leakage inductance Lko and DC resistance DCRo connected in series. Preferably, the inductance Lko is at least 10 or 20 times as great as the leakage inductance of each of the coupled inductors L1 L2.

It is important to note that in the embodiment of FIG. 6 having the center tap inductor Lo, the RC circuit 22 is connected in parallel with both the output inductor L1 and center tap inductor Lo. Similarly, the RC circuit 24 is connected in parallel with both the output inductor L2 and center tap inductor Lo.

Figure 7:
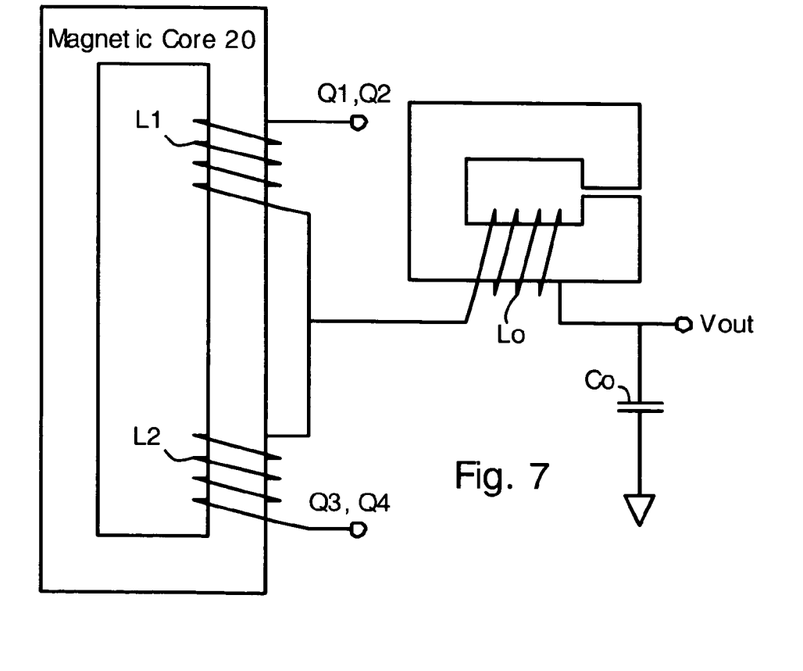
FIG. 7 shows exemplary coupled output inductors and center tap inductor that can be used in the circuit of FIG. 6.

FIG. 7 illustrates an exemplary structure for the coupled inductors L1 L2 and uncoupled inductor Lo in the embodiment of FIG. 6. It is clear that center tap inductor Lo is not magnetically coupled to L1 or L2, and therefore behaves as a pure leakage inductance.

In the embodiment of FIG. 6, the RC circuits 22 24 must be matched according to the resistances DCRo DCR1 DCR2 and inductance Lko. The inductance values of coupled inductors 26 28 do not affect the required RC time constant for the RC circuits 22 24. Specifically, for the 2 phase embodiment of FIG. 6, the RC circuit 22 must be matched such that:

$$Rc1C1 = \frac{L_{ko}}{\left(DCR_o + \frac{DCR_1}{2}\right)}.$$

Similarly, RC circuit 24 must be matched such that:

$$Rc2C2 = \frac{L_{ko}}{\left(DCR_o + \frac{DCR_2}{2}\right)}.$$

The present inventors have discovered that when the RC circuits, coupled inductors, and uncoupled center tap inductor Lo are matched in this way, the sum of voltages across the capacitors C1 C2 is proportional to the sum of current flowing through the coupled inductors L1 L2, respectively.

When voltages from the capacitors C1 C2 are provided to the voltage adder 32, the output of the voltage adder is accurately proportional to an instantaneous total sum of currents in the inductors L1 12. Hence, the present invention allows current sensing in coupled inductors when a center tap inductor Lo is connected to the coupled inductors.

It is important to note that the above equation is based on the assumption that DCR1=DCR2. This will almost always be the case in multiphase voltage regulators because each phase is typically identical.

It is noted that the circuit of FIG. 6 can be expanded to have 3, 4 or more phases, with RC circuits provided for each phase. In this case, the RC circuits must be matched such that $$Rc_nC_n = \frac{L_{ko}}{\left(DCR_o + \frac{DCR_n}{N}\right)}.$$

where N is the total number of phases, and n is a phase number index (e.g. n=1 for RC circuit 22, and n=2 for RC circuit 24 in the embodiment of FIG. 6). When this matching condition is met, the sum of voltages across the capacitors $C2, C2, \ldots C_N$ will be accurately proportional to the sum of current flowing through the coupled inductors $L1, L2, \ldots L_N$. A voltage adder can be used to add the voltages and provide a sum of all the currents in the coupled inductors.

It is important to note that the above equation requires that DCR1=DCR2= . . . =DCRn. This will almost always be the case in multiphase voltage regulators.

Also, it is important to note that, in the embodiments having a center tap inductor Lo, it is not required for every phase to have an associated RC circuit. For example, a single RC circuit can be provided for measuring the time-averaged current in a single one of the output inductors. Time-averaged current sensing is adequate for providing current sharing among phases in a multi-phase converter, or for other applications. Also for example, 2 or 3 of 4 phases can have an associated RC circuit. Such embodiments are within the scope of the invention and appended claims.

Figure 8:
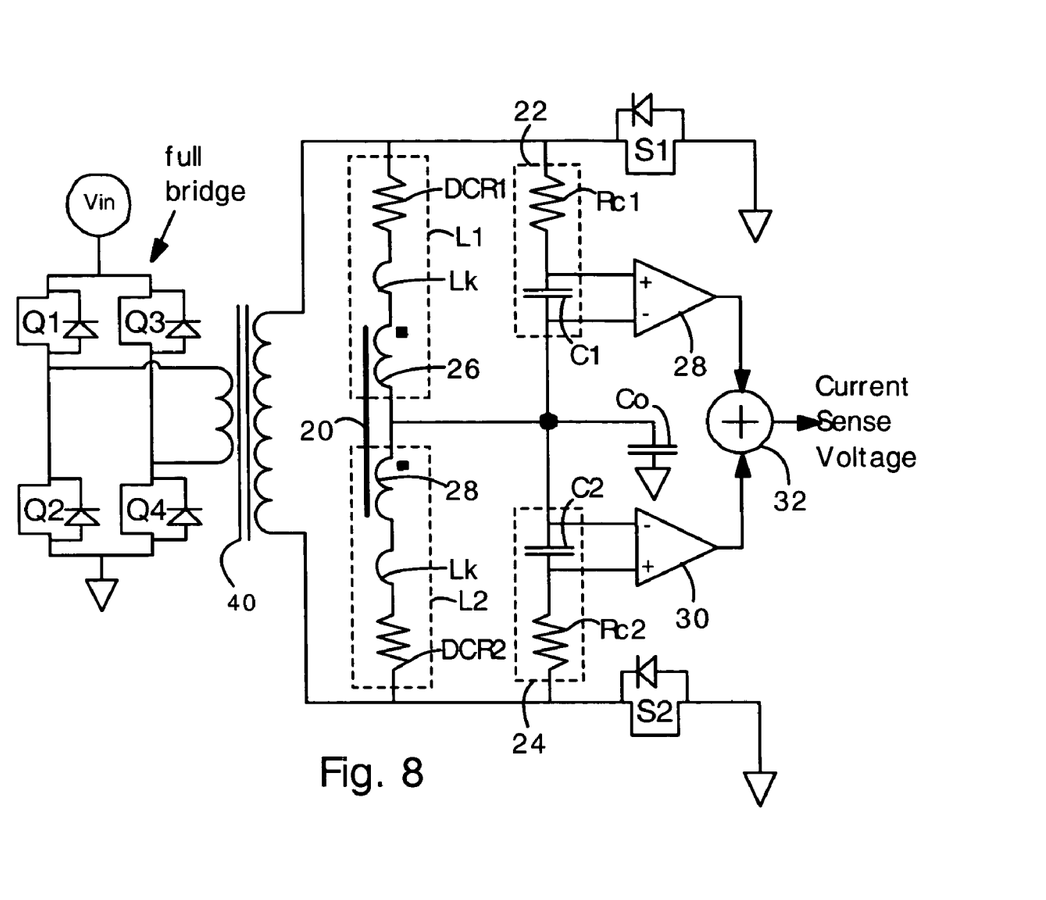
FIG. 8 shows a full wave bridge voltage regulator that can use the current sensing circuit of the present invention. The present current sensor can be used in any type of voltage regulator having coupled output inductors.

The present invention can be used with many different kinds of voltage regulators for sensing current flowing through coupled inductors. FIG. 8, for example shows a voltage regulator having coupled output inductors L1 L2. Secondary switches S1 S2 are operated to rectify the power from transformer 40. The RC circuits 22 24 are connected in parallel with coupled inductors L1 L2. In FIG. 8 the primary circuit is a full bridge. However, the full bridge primary circuit can be replaced with a symmetric half bridge circuit or a push-pull circuit, for example.

The present invention provides a simple and accurate technique for sensing current in coupled inductors. The present invention can be used in any voltage regulator where it is necessary to sense current in coupled inductors. The present invention can be used in multi-phase buck regulators, multi-phase boost regulators, multi-phase buck-boost regulators, full bridge regulators, and any other multi-phase DC—DC converter or regulator having coupled inductors.

The present invention is particularly well suited for implementing adaptive voltage positioning in microprocessor voltage regulators, memory voltage regulators, and other electronic circuits requiring well-regulated electrical power.

It will be clear to one skilled in the art that the above embodiment may be altered in many ways without departing from the scope of the invention. Accordingly, the scope of the invention should be determined by the following claims and their legal equivalents.

What is claimed is:

1. A voltage regulator, comprising:
   a first output inductor a DC resistance DCR1;
   a second output inductor, arranged magnetically mutually coupled with the first output inductor, wherein the arrangements of the first and second outputs inductors is such that the first output inductor has a leakage inductance Lk1; and
   a first RC circuit connected in parallel with the first output inductor, the first RC circuit comprising a resistor and a capacitor connected in series, wherein the first RC circuit is arranged to have an RC time constant approximately equal to Lk1/DCR1.

2. The voltage regulator of claim 1 wherein the first and second output inductors are arranged such that the second output inductor has and a DC resistance DCR2, and wherein the first and second output inductors are arranged such that the second output inductor has a leakage inductance Lk2 and further comprising:
   a second RC circuit connected in parallel with the second output inductor, wherein the second RC circuit comprises a resistor and a capacitor connected in series, and wherein the second RC circuit is arranged to have an RC time constant approximately equal to Lk2/DCR2; and
a voltage adder for adding voltages across capacitors in the first and second RC circuits, whereby a voltage output of the voltage adder is proportional to a sum of currents flowing through the first and second output inductors.

3. The voltage regulator of claim 1 wherein the voltage regulator is a multiple phase buck regulator and each output inductor is an output inductor of a separate buck regulator phase.

4. The voltage regulator of claim 2 wherein the first RC circuit has an RC time constant equal to Lk1/DCR1 to within 20%, and wherein the second RC circuit has an RC time constant equal to Lk2/DCR2 to within 20%.

5. The voltage regulator of claim 2 wherein the first RC circuit has an RC time constant equal to Lk1/DCR1 to within 10%, and wherein the second RC circuit has an RC time constant equal to Lk2/DCR2 to within 10%.

6. The voltage regulator of claim 2 further comprising a first voltage buffer or amplifier receiving voltage across the capacitor in the first RC circuit, a second voltage buffer or amplifier receiving voltage across the capacitor in the second RC circuit, and each voltage buffer or amplifier providing voltage to the voltage adder.

7. The voltage regulator of claim 2 wherein Lk1=Lk2 to within 10%.

8. The voltage regulator of claim 2 wherein DCR1=DCR2 to within 10%.

9. The voltage regulator of claim 2 further comprising:
   a third output inductor, arranged magnetically coupled to the first and to the second inductor, having a leakage inductance Lk3 and a DC resistance DCR3;
   a third RC circuit connected in parallel with the third output inductor,
   wherein the first RC circuit comprises a resistor and a capacitor connected in series, and wherein the third RC circuit has an RC time constant approximately equal to Lk3/DCR3,
   and wherein the voltage adder adds voltages across capacitors in the first, second, and third RC circuits, whereby a voltage output of the voltage adder is proportional to a sum of currents flowing through the first, second, and third output inductors.

10. The voltage regulator of claim 2 wherein Lk1=Lk2=Lk3 to within 10% and DCR1=DCR2=DCR3 to within 10%.

11. A voltage regulator having N phases, where N≧2, comprising:
   at least two coupled output inductors, with each of the coupled output inductors in different phases, and wherein each of the output inductors has an approximately equal DC resistance of DCR;
   a center tap inductor receiving electrical current from and connected in series with each of the coupled output inductors, wherein the center tap inductor is not magnetically coupled to the coupled output inductors, and wherein the center tap inductor has a self inductance Lko and a DC resistance DCRo; and
   an RC circuit connected in parallel with one of the coupled output inductors and the center tap inductor, wherein the RC circuit comprises a resistor and a capacitor connected in series, and wherein the RC circuit has an RC time constant approximately equal to $$\frac{L_{ko}}{\left(DCR_o + \frac{DCR}{N}\right)}.$$

12. The voltage regulator of claim 11, wherein the center tap inductor has an inductance at least 10 times as great as a leakage inductance of each of the coupled inductors.

13. The voltage regulator of claim 11, wherein the voltage regulator comprises N RC circuits, and comprises at least one coupled output inductor in each phase, wherein one RC circuit is connected in parallel with an output inductor in each phase and the center tap inductor, and wherein each coupled output inductor has a DC resistance $DCR_n$, where n is a phase index, and wherein each RC circuit has an RC time constant approximately equal to $$\frac{L_{ko}}{\left(DCR_o + \frac{DCR_n}{N}\right)},$$

and further comprising:
   a voltage adder for adding voltages across capacitors in the N RC circuits, whereby a voltage output of the voltage adder is proportional to a sum of currents flowing through the N output inductors.

14. The voltage regulator of claim 11, wherein the N phase voltage regulator is an N phase buck regulator, and wherein each of the coupled output inductors is an output inductor for a buck regulator phase.

15. The voltage regulator of claim 11, wherein the RC circuit has an RC time constant equal to $$\frac{L_{ko}}{\left(DCR_o + \frac{DCR}{N}\right)}$$

to within 20%.

16. The voltage regulator of claim 11, wherein the RC circuit has an RC time constant equal to $$\frac{L_{ko}}{\left(DCR_o + \frac{DCR}{N}\right)}$$

to within 10%.

17. The voltage regulator of claim 13, wherein the voltage regulator comprises N voltage buffers or amplifiers receiving voltages from across capacitors in the N RC circuits, and wherein the voltage adder adds voltages from the N voltage buffers or amplifiers.

18. An N-phase voltage regulator, and wherein each phase includes:
   a plurality of coupled output inductors, constructed and arranged such that each of the coupled output inductors is coupled to at least one other of the output inductors, a first of said coupled output inductors having a leakage inductance Lk1 and a DC resistance DCR1, and a second of said coupled output inductors having a leakage inductance Lk2 and a DC resistance DCR2; and
   an RC circuit connected in parallel with the first of the coupled output inductors, wherein the RC circuit comprises a resistor having a resistance R1 and a capacitor having a capacitance C1 connected in series, and wherein the RC circuit is constructed and arranged to have an R1C1 time constant approximately equal to Lk1/DCR1.

19. The N-phase voltage regulator of claim 18, wherein each phase comprises a buck regulator.

20. The N-phase voltage regulator of claim 18, further comprising:
   another RC circuit, connected in parallel with another of said mutually coupled output inductors, wherein said another RC circuit comprises a resistor having a resistance R2 and a capacitor having a capacitance C2 connected in series, and wherein said another RC circuit is constructed and arranged to have an RC time constant approximately equal to Lk2/DCR2; and
   a voltage adder for adding voltages across the respective capacitors in the RC circuits.

* * * * *